United States Patent
McCloskey-Lini (10) Patent No.: US 12,529,648 B2
(45) Date of Patent: Jan. 20, 2026

(54) COLORED REAGENT COMPLEX AND METHOD OF DETECTING A RUST REMOVING AGENT IN METAL WORKING FLUIDS USING THE SAME

(71) Applicant: Northern Technologies International Corporation, Circle Pines, MN (US)

(72) Inventor: Ildiko McCloskey-Lini, Lino Lakes, MN (US)

(73) Assignee: Northern Technologies International Corporation, Circle Pines, MN (US)

(\*) Notice: Subject to any disclaimer, the term of this patent is extended or adjusted under 35 U.S.C. 154(b) by 562 days.

(21) Appl. No.: 18/168,662

(22) Filed: Feb. 14, 2023

(65) Prior Publication Data
US 2023/0266231 A1 Aug. 24, 2023

Related U.S. Application Data (60) Provisional application No. 63/311,506, filed on Feb. 18, 2022.

(51) Int. Cl.
*B01L 3/00* (2006.01)
*B01D 15/08* (2006.01)
*B01F 33/302* (2022.01)
*B01F 33/3033* (2022.01)
*B01L 7/00* (2006.01)
*B01L 9/00* (2006.01)
(Continued)

(52) U.S. Cl.
CPC ............. *G01N 21/01* (2013.01); *G01N 21/62* (2013.01); *B21B 45/0287* (2013.01); *G01N 2021/1742* (2013.01); *G01N 2021/757* (2013.01)

(58) Field of Classification Search
CPC .......... G01N 21/01; G01N 21/62; G01N 2021/1742; G01N 2021/757; G01N 33/2894; G01N 31/22; G01N 21/78; B21B 45/0287
See application file for complete search history.

(56) References Cited

FOREIGN PATENT DOCUMENTS

| CN | 104342657 A | * | 2/2015 | ............. C23C 22/82 |
| CN | 106841513 A | * | 6/2017 | ............. G01N 31/16 |
| JP | H07294509 A | * | 11/1995 | |

OTHER PUBLICATIONS

Wu et al., Facile and rapid determination of oxalic acid by fading spectrophotometry based on Fe(III)-sulfosalicylate as colorimetric chemosensor, Spectrochimica ACTA Part A: Molecular and Biomolecular Spectroscopy, Elsevier, Amsterdam, NL, vol. 284, Aug. 28, 2022.

(Continued)

*Primary Examiner* — Jennifer Wecker
*Assistant Examiner* — Oyeleye Alexander Alabi
(74) *Attorney, Agent, or Firm* — Fox Rothschild LLP (57) ABSTRACT

Methods for detecting an amount of a rust removing agent in a sample are disclosed, the methods using a colored reagent complex formed from a reaction of a transition metal salt and a salicylate salt or acid, or a derivative thereof. A method includes making a test sample solution comprising the sample and the colored reagent complex, evaluating the visible color and/or absorption value of the test sample solution, and comparing the visible color and/or absorption value of the test sample solution to the visible color and/or absorption value of a reference solution containing a known amount of rust removing agent.

20 Claims, 3 Drawing Sheets

(51) Int. Cl.

| | | |
|---|---|---|
| *B21B 45/02* | (2006.01) | |
| *B65G 47/80* | (2006.01) | |
| *B82Y 20/00* | (2011.01) | |
| *B82Y 30/00* | (2011.01) | |
| *B82Y 40/00* | (2011.01) | |
| *C12M 1/34* | (2006.01) | |
| *C12M 3/06* | (2006.01) | |
| *C12N 1/14* | (2006.01) | |
| *C12N 1/20* | (2006.01) | |
| *C12Q 1/02* | (2006.01) | |
| *C12Q 1/6806* | (2018.01) | |
| *C12Q 1/6844* | (2018.01) | |
| *C12Q 1/6848* | (2018.01) | |
| *C12Q 1/686* | (2018.01) | |
| *G01N 15/10* | (2024.01) | |
| *G01N 15/14* | (2024.01) | |
| *G01N 15/1433* | (2024.01) | |
| *G01N 21/01* | (2006.01) | |
| *G01N 21/17* | (2006.01) | |
| *G01N 21/29* | (2006.01) | |
| *G01N 21/62* | (2006.01) | |
| *G01N 21/65* | (2006.01) | |
| *G01N 21/75* | (2006.01) | |
| *G01N 30/02* | (2006.01) | |
| *G01N 30/30* | (2006.01) | |
| *G01N 30/72* | (2006.01) | |
| *G01N 33/543* | (2006.01) | |
| *G01N 33/557* | (2006.01) | |
| *G01N 33/574* | (2006.01) | |
| *G01N 33/58* | (2006.01) | |
| *G01N 33/92* | (2006.01) | |
| *G01N 35/00* | (2006.01) | |

(56) References Cited

OTHER PUBLICATIONS

International Search Report and Written Opinion for PCT/US2023/062522 dated Jun. 6, 2023.

\* cited by examiner

COLORED REAGENT COMPLEX AND METHOD OF DETECTING A RUST REMOVING AGENT IN METAL WORKING FLUIDS USING THE SAME

CROSS-REFERENCE TO RELATED APPLICATION

The present application claims priority to U.S. Provisional Application No. 63/311,506, filed Feb. 18, 2022, which is incorporated herein by reference in its entirety.

FIELD OF THE DISCLOSURE

This disclosure is related to a colored reagent complex, for example, containing a transition metal and a salicylate or derivative thereof, for use in detecting the amount of rust removing agent(s) in a test solution. When the rust removing agent reacts with the colored reagent complex, the colored reagent complex breaks down and there is a reduction or elimination of color, which may be detected by UV-VIS spectrophotometry, in the test solution.

BACKGROUND OF THE DISCLOSURE

Rust removers, a type of working fluid, contain one or more of an acid and/or chelating agent that removes any existing rust on a metal surface by iron oxide dissolution which is both retained in the solution and settled out. In contrast, a rust preventive creates a barrier on the metal surface or deactivates corrosive components to prevent corrosive chemicals from reacting with the metal. Rust preventives can be water based but, most often, they are oil or solvent based. Rust removers may be acidic or neutral. Rust removers are neutral when they contain one or more chelating agents or very mild organic acids or bases that can chelate solubilized iron. Chelating agents are very effective in iron ion dissolution. In practice, a component in the neutral rust remover would react with and break apart the iron oxide then the chelating agents would "grab" and chelate the iron ion. The complex formed this way would stay in solution until it reaches the critical concentration of maximum solubility. After this point, the complex would settle out of solution. This is usually at the time when the neutral rust remover is close to depletion.

The acids in the rust remover can be organic or inorganic. Acids work by donating protons that dissolve rust, and also, they can potentially complex the iron ion freed from iron oxide. Inorganic acids are more aggressive in nature than the organic acids. Acid-based rust removers come in many different formulations. Some acid-based rust removers contain only one type of acid in the formula, while other acid-based rust removers contain more than one. Selection between rust removers depends on the preference of the customer or need of the market and on the creativity of the manufacturer.

During application, rust removing agents work to break off the chemically bonded rust from the metal surface, and keep it in solution, consequently the chemistry of the rust removers is gradually depleted. Therefore, there is a desire to create a test method to determine the extent of the depletion, and when the rust remover is no longer effective.

SUMMARY

A method of detecting an amount of a rust removing agent in a sample is disclosed. The method includes: forming a colored reagent complex from a reaction of a transition metal salt and a salicylate salt or acid, or a derivative thereof; preparing a first reagent solution comprising the colored reagent complex, wherein the first reagent solution is substantially the same visible color as the colored reagent complex; adding the sample to the first reagent solution to make a test sample solution; and evaluating the color or absorbance of the test sample solution to detect the amount of rust removing agent in the sample. The transition metal salt may be a ferric ion ($Fe^{3+}$), a ferrous ion ($Fe^{2+}$), or a cupric ion ($Cu^{2+}$). The salicylate salt or acid, or derivative thereof may be a salicylate salt, optionally substituted with an electron withdrawing group, such as a halide, an aldehyde, an ester, a sulfo-group, a carboxylic group, a nitrile-group, a tertiary amine, and a nitro group. The colored reagent complex may be formed from a reaction of sodium salicylate and a ferric ion, optionally: in about a 1:1 ratio: having a purple or red color: and/or having an optimal wavelength of about 500 nm to about 550 nm. The colored reagent complex reacts with an acid to break up the colored reagent complex. The colored reagent complex may be formed from a reaction of a salicylic acid derivative substituted at the 5th carbon atom on the benzene ring from the salicylate group, such as but not limited to, cyanosalicylic acid, 5-halosalicylic acid, 5-formylsalicylic acid, 5-nitrosalicylic acid, 5-sulfosalicylic acid, 5-sulfosalicylic acid, 5-sulfosalicylic acid, or 5-sulfosalicylic acid, and a ferric ion.

Evaluating the color or absorbance of the test sample solution may include: determining an absorption value of the test sample solution at an optimal wavelength; and comparing the absorption value to a reference table or to a second absorption value of a reference solution, or otherwise comparing the visible color of the test sample solution to a visible color of a reference solution.

Another method of detecting an amount of a rust removing agent in a sample is disclosed that includes: forming a colored reagent complex from a reaction of a transition metal salt and a salicylate salt or acid, or a derivative thereof; preparing a first reagent solution comprising the colored reagent complex and a second reagent solution comprising the colored reagent complex, wherein the first reagent solution and the second reagent solution are substantially equivalent; adding a standard solution containing a known amount of the rust removing agent to the second reagent solution and developing a color to make a reference solution; adding the sample to the first reagent solution to make a test sample solution; determining an absorption value of the test sample solution at an optimal wavelength and an absorption value of the reference solution at the optimal wavelength; and comparing the absorption value of the reference solution and the absorption value of the test sample solution. When a visible color of the test sample solution is lighter than the color of the reference solution, then the amount of the rust removing agent in the sample is more than the known amount in the standard solution. When the absorption value of the test sample solution is higher than the absorption value of the reference solution, the amount of the rust removing agent in the sample is less than the known amount in the standard solution; and when the absorption value of the test sample solution is less than the absorption value of the reference solution, the amount of the rust removing agent in the sample is more than the known amount in the standard solution.

A kit for determining when a sample is depleted of a rust removing agent is also disclosed herein.

DETAILED DESCRIPTION

A method is disclosed for determining the amount of a rust removing agent present in a water-based metal working fluid, also referred to as a rust remover. The method targets the rust removing agent, which is an acid and/or chelating agent, in the rust remover. The method uses a colored reagent complex that colors the test solution (i.e., a sample or the rust remover) and that is broken down by the rust removing agent in the rust remover, and optionally, the rust removing agent chelates the iron ion from the colored reagent complex. As the colored reagent complex is broken down, the color of the test solution lightens and may even disappear completely.

In known complexometric measurements and methods, many transition metal complexes are colored, and, therefore, when created, their existence is evident by the presence of the known color. However, in a method of the present disclosure, the reverse is possible and the means of detection is in the reduction or elimination of color. Because the reagent is a colored reagent complex, e.g., iron salicylate and iron salicylate derivatives are colored reagent complexes, UV-VIS spectrophotometry can be used for measurements of absorbance values and for detection of the amount of rust removing agent. The absorbance value can be measured using a spectrophotometer wherein the "absorbance value" is a unit-less number typically ranging from 0 to 3. It is the amount of photons from an incident light source that is absorbed by a fluid.

A method of detecting an amount of a rust removing agent in a sample is disclosed. The sample is a sample of a working/used rust remover and may be taken from a tank, drum or any other reposit for a metal working fluid, optionally water-based, and containing a rust removing agent. The sample may be taken from any rust remover that has been used for any amount of time and is used to determine the concentration of the rust removing agent present in the sample and/or whether the rust removing agent has been depleted and/or needs to be replenished. The sample may optionally be diluted before use in any method disclosed herein. An amount of the sample, e.g., about 0.1 mL to about 0.5 mL, or about 0.25 mL, may be placed in a test tube by any means known in the art, e.g., via pipette. The sample may have been diluted with water before or after adding the amount to the test tube. The amount of sample may be diluted by adding about 0.1 mL to about 0.5 mL, or about 0.25 mL of water into the test tube. For example, the sample may be diluted up to about the 50 mL mark line (or about 49.75 mL). When 0.25 mL of the sample is diluted with 0.25 mL of water to make about 50 mL, this makes a sample that has been diluted about 200 times. This dilution factor is determined based on the amount of rust removing agent in the sample, and may be modified as needed as understood by one of skill in the art based on the disclosure herein. The total amount of rust removing agent, by weight %, should be less than the amount of total colored reagent complex, by weight %. For samples containing an unknown amount of rust removing agent, a quick titration method may be used on the unused, new rust remover to calculate the dilution factor and/or by using the SDS of the rust remover if it discloses the concentration of rust removing agent in the rust remover.

Dilution of a sample may be performed based on Table 1.

TABLE 1

Sample dilution values

| | Total mL solution | Volume of rust remover (up to 10 mL or up to 50 mL) | | | | | | | | | | |
|---|---|---|---|---|---|---|---|---|---|---|---|---|
| Add deionized water up to 10 mL | 10 mL | 1 | 0.5 | 0.25 | 0.2 | 0.1 | 0.050 | 0.025 | 0.020 | 0.010 | 0.005 | 0.003 |
| | | 1 mL RR + 9 mL DIW | 0.5 + 9.5 | 0.25 + 9.75 | 0.2 + 9.8 | 0.1 + 9.9 | 0.05 + 9.95 | 0.025 + 9.975 | 0.02 + 9.98 | 0.01 + 9.99 | 0.005 + 9.995 | 0.003 + 9.997 |
| Add deionized water up to 50 mL | 50 mL | 5 | 2.5 | 1.25 | 1 | 0.5 | 0.25 | 0.125 | 0.1 | 0.05 | 0.025 | 0.013 |
| | | 5 mL RR + 45 mL DIW | 2.5 + 47.5 | 1.25 + 48.75 | 1 + 49 | 0.5 + 49.5 | 0.25 + 49.75 | 0.125 + 49.875 | 0.1 + 49.9 | 0.05 + 49.99 | 0.025 + 49.975 | 0.013 + 49.987 |

| | | Dilutions | | | | | | | | | |
|---|---|---|---|---|---|---|---|---|---|---|---|
| % acid | ppm | 10 | 20 | 40 | 50 | 100 | 200 | 400 | 500 | 1000 | 2000 | 4000 |
| 50 | 500000 | 50000 | 25000 | 12500 | 10000 | 5000 | 2500 | 1250 | 1000 | 500 | 250 | 125 |
| 45 | 450000 | 45000 | 22500 | 11250 | 9000 | 4500 | 2250 | 1125 | 900 | 450 | 225 | 112.5 |
| 40 | 400000 | 40000 | 20000 | 10000 | 8000 | 4000 | 2000 | 1000 | 800 | 400 | 200 | 100 |
| 39 | 390000 | 39000 | 19500 | 9750 | 7800 | 3900 | 1950 | 975 | 780 | 390 | 195 | 97.5 |
| 38 | 380000 | 38000 | 19000 | 9500 | 7600 | 3800 | 1900 | 950 | 760 | 380 | 190 | 95 |
| 37 | 370000 | 37000 | 18500 | 9250 | 7400 | 3700 | 1850 | 925 | 740 | 370 | 185 | 92.5 |

TABLE 1-continued

Sample dilution values

| | | | | | | | | | | | | |
|---|---|---|---|---|---|---|---|---|---|---|---|---|
| 36 | 360000 | 36000 | 18000 | 9000 | 7200 | 3600 | 1800 | 900 | 720 | 360 | 180 | 90 |
| 35 | 350000 | 35000 | 17500 | 8750 | 7000 | 3500 | 1750 | 875 | 700 | 350 | 175 | 87.5 |
| 34 | 340000 | 34000 | 17000 | 8500 | 6800 | 3400 | 1700 | 850 | 680 | 340 | 170 | 85 |
| 33 | 330000 | 33000 | 16500 | 8250 | 6600 | 3300 | 1650 | 825 | 660 | 330 | 165 | 82.5 |
| 32 | 320000 | 32000 | 16000 | 8000 | 6400 | 3200 | 1600 | 800 | 640 | 320 | 160 | 80 |
| 31 | 310000 | 31000 | 15500 | 7750 | 6200 | 3100 | 1550 | 775 | 620 | 310 | 155 | 77.5 |
| 30 | 300000 | 30000 | 15000 | 7500 | 6000 | 3000 | 1500 | 750 | 600 | 300 | 150 | 75 |
| 29 | 290000 | 29000 | 14500 | 7250 | 5800 | 2900 | 1450 | 725 | 580 | 290 | 145 | 72.5 |
| 28 | 280000 | 28000 | 14000 | 7000 | 5600 | 2800 | 1400 | 700 | 560 | 280 | 140 | 70 |
| 27 | 270000 | 27000 | 13500 | 6750 | 5400 | 2700 | 1350 | 675 | 540 | 270 | 135 | 67.5 |
| 26 | 260000 | 26000 | 13000 | 6500 | 5200 | 2600 | 1300 | 650 | 520 | 260 | 130 | 65 |
| 25 | 250000 | 25000 | 12500 | 6250 | 5000 | 2500 | 1250 | 625 | 500 | 250 | 125 | 62.5 |
| 24 | 240000 | 24000 | 12000 | 6000 | 4800 | 2400 | 1200 | 600 | 480 | 240 | 120 | 60 |
| 23 | 230000 | 23000 | 11500 | 5750 | 4600 | 2300 | 1150 | 575 | 460 | 230 | 115 | 57.5 |
| 22 | 220000 | 22000 | 11000 | 5500 | 4400 | 2200 | 1100 | 550 | 440 | 220 | 110 | 55 |
| 21 | 210000 | 21000 | 10500 | 5250 | 4200 | 2100 | 1050 | 525 | 420 | 210 | 105 | 52.5 |
| 20 | 200000 | 20000 | 10000 | 5000 | 4000 | 2000 | 1000 | 500 | 400 | 200 | 100 | 50 |
| 19 | 190000 | 19000 | 9500 | 4750 | 3800 | 1900 | 950 | 475 | 380 | 190 | 95 | 47.5 |
| 18 | 180000 | 18000 | 9000 | 4500 | 3600 | 1800 | 900 | 450 | 360 | 180 | 90 | 45 |
| 17 | 170000 | 17000 | 8500 | 4250 | 3400 | 1700 | 850 | 425 | 340 | 170 | 85 | 42.5 |
| 16 | 160000 | 16000 | 8000 | 4000 | 3200 | 1600 | 800 | 400 | 320 | 160 | 80 | 40 |
| 15 | 150000 | 15000 | 7500 | 3750 | 3000 | 1500 | 750 | 375 | 300 | 150 | 75 | 37.5 |
| 14 | 140000 | 14000 | 7000 | 3500 | 2800 | 1400 | 700 | 350 | 280 | 140 | 70 | 35 |
| 13 | 130000 | 13000 | 6500 | 3250 | 2600 | 1300 | 650 | 325 | 260 | 130 | 65 | 32.5 |
| 12 | 120000 | 12000 | 6000 | 3000 | 2400 | 1200 | 600 | 300 | 240 | 120 | 60 | 30 |
| 11 | 110000 | 11000 | 5500 | 2750 | 2200 | 1100 | 550 | 275 | 220 | 110 | 55 | 27.5 |
| 10 | 100000 | 10000 | 5000 | 2500 | 2000 | 1000 | 500 | 250 | 200 | 100 | 50 | 25 |
| 9 | 90000 | 9000 | 4500 | 2250 | 1800 | 900 | 450 | 225 | 180 | 90 | 45 | 22.5 |
| 8 | 80000 | 8000 | 4000 | 2000 | 1600 | 800 | 400 | 200 | 160 | 80 | 40 | 20 |
| 7 | 70000 | 7000 | 3500 | 1750 | 1400 | 700 | 350 | 175 | 140 | 70 | 35 | 17.5 |
| 6 | 60000 | 6000 | 3000 | 1500 | 1200 | 600 | 300 | 150 | 120 | 60 | 30 | 15 |
| 5 | 50000 | 5000 | 2500 | 1250 | 1000 | 500 | 250 | 125 | 100 | 50 | 25 | 12.5 |
| 4 | 40000 | 4000 | 2000 | 1000 | 800 | 400 | 200 | 100 | 80 | 40 | 20 | 10 |
| 3 | 30000 | 3000 | 1500 | 750 | 600 | 300 | 150 | 75 | 60 | 30 | 15 | 7.5 |
| 2 | 20000 | 2000 | 1000 | 500 | 400 | 200 | 100 | 50 | 40 | 20 | 10 | 5 |
| 1 | 10000 | 1000 | 500 | 250 | 200 | 100 | 50 | 25 | 20 | 10 | 5 | 2.5 |

Lower dilutions, from 10× to 200×, are easier to achieve in field applications with disposable transfer pipettes but higher dilutions may prove more difficult. To achieve higher dilutions in the field, a series of dilutions may be needed.

For example, if a 400× dilution is needed, first a lower dilution may be accomplished, either by using a 40× or a 200× diluted samples. When a 40× diluted sample is used, then it would need to be further diluted ten fold, that is, add 5 mL of 40× diluted sample and dilute it with deionized water up to 50 mL. When a 200× diluted sample is used, then it would need to be further diluted two fold, meaning that 25 mL of 200× diluted sample is diluted up to 50 mL (by adding 25 mL deionized water).

For example a 1000× diluted sample may be prepared either by first making a 100× diluted sample or a 500× diluted sample. A 100× diluted sample would only then have to be diluted 10× fold using only two conical tubes. A 500× dilution first would have to use one conical tubes to prepare a 50× diluted sample. Then the 50× diluted sample would have to be diluted 10× fold to obtain the 500× dilution then a third dilution of 2× fold would bring the concentration down to 1000× dilution.

Table 2 shows how to make highly diluted samples while conserving samples, deionized water and conical tube.

TABLE 2

| | Dilutions (x) | | | | | | | | | | | |
|---|---|---|---|---|---|---|---|---|---|---|---|---|
| 50 | 10 | 20 | 40 | 50 | 100 | 200 | 400 | 500 | 1000 | 2000 | 4000 | final dilution |
| | | | | | | | 0.125 | 0.1 | 0.05 | 0.025 | 0.0125 | can only be done in a lab |
| | | | | | | | 40 | 50 | 100 | 200 | 400 | diluted sample to use to make a 10× dilution to make a higher dilution |
| mL sample | 5 | 2.5 | 1.25 | 1 | 0.5 | 0.25 | 5 | 5 | 5 | 5 | 5 | |
| mL deionzed water | 45 | 47.5 | 48.75 | 49 | 49.5 | 49.75 | 45 | 45 | 45 | 45 | 45 | |
| 50 mL total | | | | | | | | | | | | |
| | Using only one 50 mL conical tube for diluting the sample | | | | | | Using two 50 mL conical tubes for the two-step dilution of the sample. Sample requires sequential dilution to obtain lower concentration values | | | | | |

The method includes the steps of: forming a colored reagent complex from a reaction of a transition metal salt and a salicylate salt or acid, or a derivative thereof; preparing a first reagent solution comprising the colored reagent complex; adding a sample (e.g., of a used rust remover having unknown concentration of rust removing agent) to a portion of the first reagent solution to make a test sample solution; and evaluating the color or absorbance of the test sample solution to detect the amount of rust removing agent in the sample. In a method of comparison (which may also be referred to as a comparative method), the color of the test sample solution may be compared, e.g., visually, to a color of the first reagent solution. In another method, the first reagent solution may be analyzed using UV-VIS spectrophotometry to determine the upper absorbance value of the colored reagent complex. The test sample solution may also be analyzed using UV-VIS spectrophotometry to obtain an absorbance value. The absorbance value of the test sample solution may be compared to the absorbance value of the first reagent solution and/or to a reference solution having a known concentration of rust removal agent therein.

The first reagent solution may be substantially the same visible color as the colored reagent complex. The first reagent solution may be prepared by adding about 0.5 mL to about 50 mL of a concentrated colored reagent complex solution to about 2 mL to about 200 mL of deionized water to make about 2.5 mL to about 1000 mL of the first reagent solution. The first reagent solution may be prepared by adding about 1 mL of a concentrated colored reagent complex solution to about 4 mL of deionized water to make about 5 mL of the first reagent solution. The concentrated colored reagent complex solution includes a colored reagent complex in water.

After the addition of the sample to the first reagent solution, a portion of the first reagent solution, or to a second reagent solution that is substantially equivalent to the first reagent solution, to make a test sample solution, the color of the test sample solution may be reduced, eliminated or it may remain unchanged from the color of the first reagent solution. When the color is unchanged, the sample may not contain any rust removing agent; that is, it indicates that the sample may be depleted of the rust removing agent.

Evaluating the test sample solution may be done by a visual inspection with the eye or by determining an absorption value of the test sample solution with a spectrophotometer. The visible color and/or the calculated absorption value may be compared to the visible color or the absorption value, respectively, of a reference solution, which contains new and unused working fluid with a known amount of the rust removing agent. When the spectrophotometer is used, the difference in absorbance value of the test sample solution and the reference solution may be used to calculate the amount of rust removing agent in the test sample solution.

The rust removing agent may be an organic acid, an inorganic acid, a chelating agent, or a combination thereof. The rust removing agent may be an organic acid, such as, but not limited to, acetic acid, oxalic acid, a alpha hydroxy carboxylic acid, and the like. The rust removing agent may be an inorganic acid, such as, but not limited to, phosphoric acid, sulfuric acid, hydrochloric acid, and the like. The rust removing agent may be a chelating agent, such as, but not limited to, ethylenediaminetetraacetic acid (EDTA), diethylenetriaminepentaacetic acid (DTPA), nitrilotriaceticacid (NTA), and the like. The colored reagent complex reacts with the rust removing agent to break up the colored reagent complex and reduce or eliminate the color of the test sample or reference solution in which the colored reagent complex is reduced by the rust remover "grabbing" the iron ion from the colored reagent complex.

Figure 1:
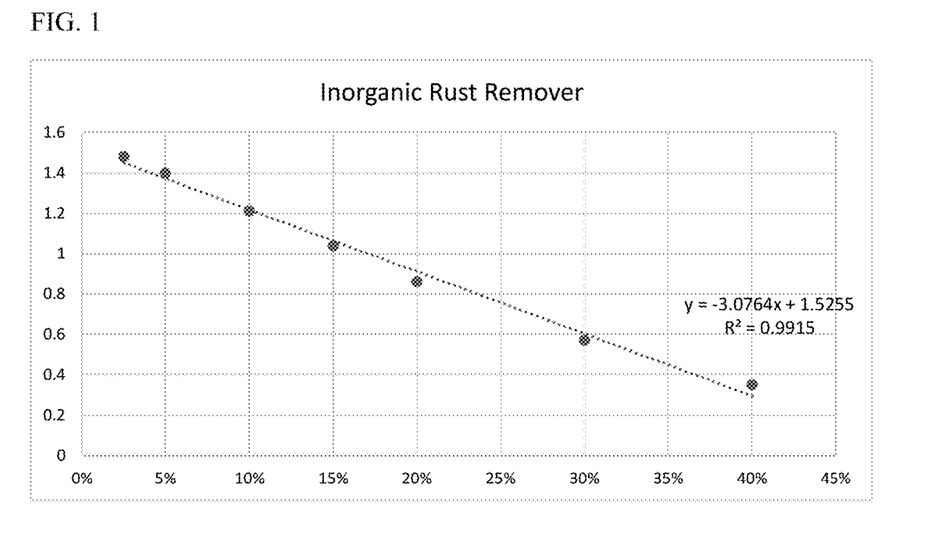
FIG. 1 is a graph of the absorbance value versus concentration of inorganic acid in the rust remover showing inorganic rust remover response to ferric salicylate.
Figure 2:
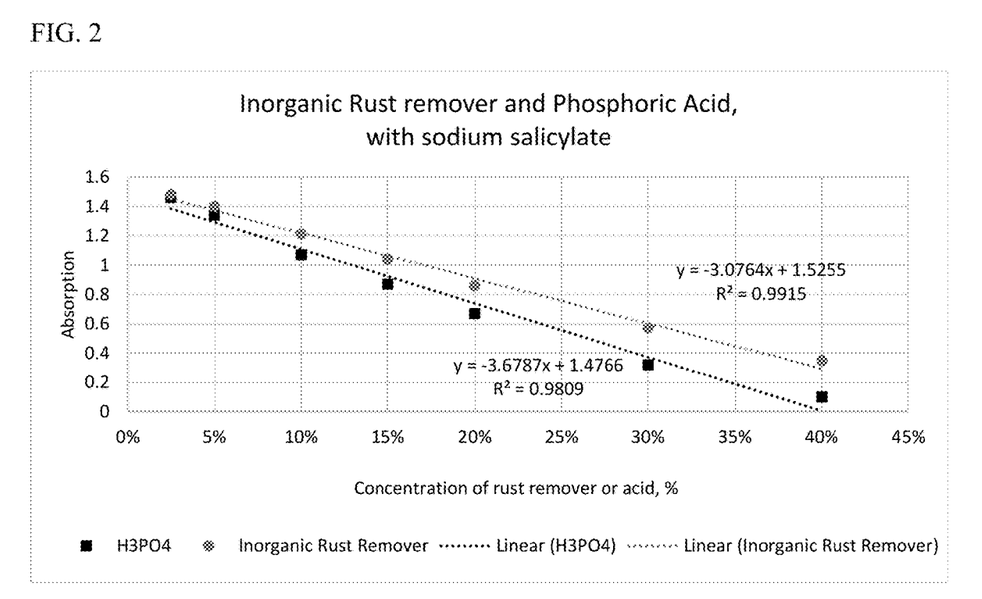
FIG. 2 is a graph of the absorbance value versus concentration of inorganic acid in the rust remover showing inorganic rust remover and phosphoric acid response to ferric salicylate.
Figure 3:
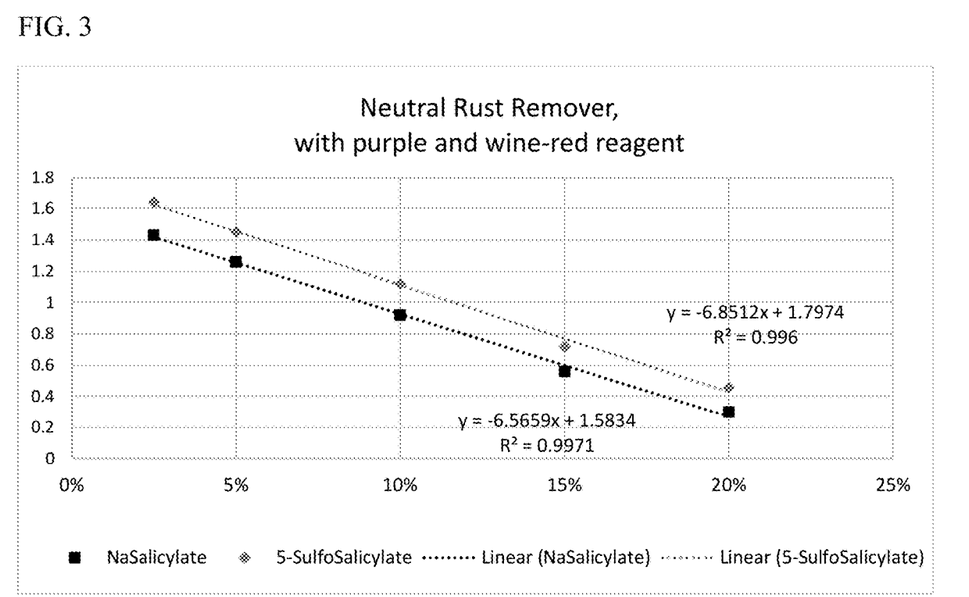
FIG. 3 is a graphical representation of the absorbance value versus concentration of neutral acid in the rust remover showing a neutral rust remover response to ferric salicylate and ferric 5-sulfosalicylate.

From the reduction in color, effectuated by the amount and concentration of colored reagent complex broken down by the rust removing agent, the amount of rust removing agent in the sample can be calculated and the depletion of the rust remover can be determined. The amount of colored reagent complex that breaks down is directly proportional to the amount of acid or chelating agent in the rust removing agent (see, e.g., FIG. 1-3). For example, FIG. 1 shows a response of an inorganic acid to ferric salicylate colored reagent. FIG. 2 shows a comparison of the response of the inorganic rust remover and its acid alone to ferric salicylate, colored reagent complex. The color of the colored reagent complex stays the same, regardless of the acid or complexing agent used, however the intensity of the color or the absorbance value decreases or disappears with increasing concentration of the acid. The wavelength or the color of the colored reagent complex should remain consistent and only the intensity or absorbance value changes. FIG. 3 shows the response of a neutral rust remover to two different colored reagent complexes, ferric salicylate (purple) and ferric 5-sulfosalicylate (wine red). If the UV-VIS optimal wavelength, e.g., 500 nm or 550 nm, changes, it indicates that the colored reagent complex itself has changed to a different colored reagent complex (i.e., compound). In which case, the resulting data would be unreliable.

The colored reagent complex may be formed from a reaction of a transition metal salt and a salicylate salt or acid, or a derivative thereof. The transition metal ion and the salicylate ion, or derivative of salicylate, may react and combine in a 1:1 ratio. The colored reagent complex may be a purple or a red color depending on the salicylate or salicylate derivative. The red color may be a deep red, such as a wine color originating from the sulfo derivative of the salicylic acid. The colored reagent complex may have a UV-VIS optimal wavelength of about 500 nm to about 550 nm, or about 500 to about 535 nm (when sodium salicylate is used).

In an embodiment, the colored reagent complex is purple and the maximum absorbance is about 525 nm to about 535 nm, or about 530 nm with UV-VIS spectrometer. When the concentration of the colored reagent complex decreases, the absorption value at 530 nm also decreases. In an embodiment, the colored reagent complex is wine red and the maximum absorbance is about 495 nm to about 515 nm, about 500 nm to about 510 nm, or about 505 nm with UV-VIS spectrometer. Optimal wavelength is at the absorbance maximum based on the Lambert-Beer Law that relates absorbance to sample concentration. The absorbance maximum is always at the same wavelength during measurements. This is an indication of the same colored complex being present during the measurements.

The transition metal ion may be a ferric ion ($Fe^{3+}$), a ferrous ion ($Fe^{2+}$), or a cupric ion ($Cu^{2+}$). The transition metal salt used to form the colored reagent complex may be ferric chloride, ferrous chloride, or ferric nitrate. The transition metal salt used to form the colored reagent complex may be ferric chloride. The most stable complex may be achieved with ferric ion ($Fe^{3+}$). The source of the ferric chloride may also contribute to the stability of the colored reagent complex. It was found that ferric cation from ferric nitrate with sodium salicylate will precipitate out but will remain in solution when 5-sulfo salicylate is used. Ferric cation with 2,4-dihydroxy salicylate forms a stable complex, even when the ferric cation originates from ferric nitrate. Other transition metals would not form a more intense color than the ferric cation.

Substituents on the benzene ring of the salicylate may have an electron donating or electron withdrawing effect. A sulfo-group on the benzene ring that is electron withdrawing will form ML (i.e., 1:1 metal to ligand), or ML2 (i.e., 1:2 metal to ligand) complexes. ML is a general formula of the complex ion, where M stands for the metal ion and L stand for ligand. A complex ion is comprised of a central atom and surrounding ligands. However, the color of the reagent complex will be different when different substituent is present on the salicylate parent molecule. The wavelength and maximum absorbance value will be adjusted accordingly for each salicylate derivative as understood by one or ordinary skill in the art and discussed herein. If there are no substituents on the salicylate component, for example, with sodium salicylate, the reaction may result in multiple forms of the colored reagent complex, e.g., ML, ML2, ML3 (i.e., 1:3 metal to chelate), and/or MHL. When different multidentate colored complexes form, it destabilizes the reagent solution by the different complexes forming large aggregates that will eventually settle out. Settling out (i.e., precipitation) causes the concentration of the colored reagent complex in the solution to decrease. Colored reagent complexes in a more concentrated reagent solution settle out of the solution faster than in a more diluted reagent solution.

The substituent(s) on a salicylate component of the colored reagent complex, which are groups that do not participate in the chelation of the metal ion, may be an electron withdrawing group or an electron donating group. The position of the substituent groups on the benzene ring may alter the stability of the colored reagent complex formed and may influence the stability of the solution. Suitable electron withdrawing substituents include halides, sulfo-groups, halides, nitrile-groups, tertiary amines, and nitro groups, for example, as follows:

The salicylate salt or acid, or a derivative thereof, may be a salicylate salt, such as, but not limited to sodium salicylate. The salicylate salt or acid, or a derivative thereof, may be a salicylate derivative optionally having a substitution on the benzene ring. The substitution may be at the 5 position on the benzene ring, according to the following formula:

wherein $R^a$ may be an electron withdrawing group. The electron withdrawing group may be selected from the group consisting of: a halide, an aldehyde (—COH, —COR), an ester (—COOR), a sulfo-group (—SO$_3$H), a carboxylic group (—COOH), a nitrile-group, a tertiary amine (—NR$_3$), and a nitro group (—NO$_2$), wherein R may be a lower alkyl (C$_1$-C$_6$ group), alkene, or aryl group. R may be lower alkyl. The halide may be chlorine, bromide, fluorine or iodine. The halide may be chlorine or bromide. The salicylate salt or acid, or a derivative thereof may be 5-cyanosalicylic acid, 5-halosalicylic acid, 5-formylsalicylic acid, or 5-nitrosalicylic acid. The salicylate salt or acid, or a derivative thereof may be:

5-sulfosalicylic acid  or  sodium salicylate

The hydroxyl group at the 2 position of the benzene ring may be unsubstituted. When it is substituted with a lower alkyl group, or other groups, a colored reagent complex either doesn't form or is very unstable. Derivatives of salicylate acid form more stable and effective colored reagent complexes when the hydroxy group at the 2 position is retained and unsubstituted. If the hydroxyl group is at position 3, or 5, or meta positions, or position 4, or para position, instead of the 2 position, the compound does not result in colored complexes because the hydroxyl group is farther from the carboxyl group.

Stable derivatives include 5-sulfosalicylate. Sodium salicylate is stable at a less concentrated level of 0.005 mol/L while 5-sulfo salicylate is stable at 0.02 mol/L. The 2,4-dihydroxy salicylate is also stable.

The colored reagent complex may be formed from a reaction of a salicylic acid derivative of the following formula:

wherein $R^a$ is an electron withdrawing group, and a ferric ion. The colored reagent complex may be formed from a reaction of 5-cyanosalicylic acid, 5-halosalicylic acid, 5-formylsalicylic acid, or 5-nitrosalicylic acid, and a ferric ion.

When the colored reagent complex is formed from a reaction of sodium salicylate and a ferric chloride, the colored reagent complex is ferric salicylate, which has a purple color, which, when diluted in water, retains its purple color. The reaction is as follows:

Salicylate ion

Ferric Salicylate ion
Purple reagent

The purple, or violet-colored reagent complex is created via a simple chelation mechanism between two components, ferric chloride and sodium salicylate. Another, red-wine colored reagent complex is created with the same ferric chloride but the ligand is 5-sulfosalicylate, a derivative of the core component of salicylic acid. The negatively charged salicylate ligand or a salicylate derivative thereof reacts with the ferric cation. The ferric cation is chelated in its hexahydrate form. The salicylate component of the reagent is an alpha hydroxy benzoic acid. The hydroxyl group is in the meta position from the carboxyl group. This is the site where the ferric ion is chelated by the carboxylic and hydroxyl groups. Not only the salicylate derivatives are able to form colored complexes that potentially can act as reagents. According to the present disclosure, the acid, from the acid-based rust removing agent, or chelating agent, from the neutral rust removing agent, would break up the colored reagent complex, in solution, and form a new complex with the ferric ion. Consequently, the purple color disappears, and the amount of colored reagent complex used is directly proportional to the amount of acid or chelating agent in the rust remover. A drawback of the reagent is that with the passage of time, the violet reagent complex, formed from ferric ion and sodium salicylate, will form large aggregates and will settle out of solution. The instability happens over time and at higher concentrations. This large precipitate has a very low solubility. Once it is in solid form, it is difficult to dissolve back into solution. Accordingly, the colored reagent complex may not be premade before purchase and shipping. One major driving factor for the instability is the exposure of the colored reagent complex to air when these large molecules start to form and eventually settle out. The working solution will gradually lose its efficacy, and become less concentrated. In certain embodiments, the same instability was not observed with the red-wine colored reagent complex of ferric ion and 5-sulfosalicylate derivative.

The violet reagent complex of ferric salicylate may have a maximum absorbance at about 530 nm with UV-VIS spectrometer, which is then the ideal wavelength for the measurements. When the aggregated large complexes form, they settle out of solution. As a result, the concentration of the colored reagent complex in the solution decreases and may not be sufficient for analysis. The red-wine colored reagent complex of ferric 5-sulfosalicylate, may have an absorbance maximum at about 500 nm. The violet-colored complex of ferric salicylate may respond better to inorganic acids while the red-wine colored complex of ferric 5-sulfosalicylate may respond better to organic acids. However, the "preference" of acids from the rust remover and colored reagent complexes depends on their affinity towards the ferric ion.

The colored reagent complex may be used to monitor the amount of rust remover agent in a working fluid or sample. Detection of the acid and/or chelating agent in rust removers depends on their relative affinity towards the ferric ion component and the strength of their newly formed complexes compared to the colored reagent complex with the salicylate ligand as well as on the relative concentration of the rust removing agent in the sample compared to the concentration of the colored reagent complex. For example, when a smaller alpha hydroxy acid like glycolic acid is in the presence of a larger alpha hydroxy carboxylic acid like citric acid, citric acid will be "stronger" and dominate at lower concentrations. If the concentration of the glycolic acid would be increased to a sufficiently higher concentration level, it will start to contribute to the color disappearance. The relative concentrations of the acids and complexing agents in the rust removers is very dependent on the formulation of the rust removers. Consequently, the effective concentration ranges of the individual acids and complexing agents, that can potentially be in the formulation of the rust removers, would be determined separately.

The colored reagent complex may be sold or obtained by a user in a concentrated solution, in which form, each of the transition metal salt (e.g. ferric chloride) and the salicylate or derivative thereof may have a 1:1 molar ratio of one ferric ion to one salicylate ion. A concentrated solution of the colored reagent complex, also referred to herein as a "concentrated colored reagent complex solution," contains the colored reagent complex in water. The concentrated colored reagent complex solution may be about 0.01 mol/L to about 0.03 mol/L, about 0.01 mol/L to about 0.02 mol/L, or about 0.02 mol/L. Each of the transition metal salt (e.g. ferric chloride or ferrous chloride) and the salicylate salt or acid, or derivative thereof may be adjusted to about 0.005 mol/L concentration to form a 1:1 complex in water. This will result in about 0.1% of each component of ferric ion and salicylate or salicylate derivative. Forming a 1:1 complex, the concentration of the concentrated colored reagent complex solution may be about 0.005 mol/L or 0.1%. This starting concentration of 0.005 mol/L may be used for both the purple ferric salicylate and the red-wine ferric 5-sulfosalicylate reagent complexes.

Optionally, to make up the purple ferric salicylate complex, the amount of ferric chloride hexahydrate added is calculated as following:

$$270.29 \; \frac{g}{mol} \times 0.005 \; \frac{mol}{L} = 1.351 \; \frac{g}{L}$$

that is $$0.135 \frac{g}{100 \text{ mL}}$$

that is about 0.14%. For sodium salicylate $$160.11 \frac{g}{mol} \times 0.005 \frac{mol}{L} = 0.801 \frac{g}{L}$$

that is $$0.080 \frac{g}{100 \text{ mL}}$$

that is less than 0.10% preferred due to safety concerns. These amounts of each of each of the components will result in a 1:1 complex, that was determined previously, experimentally, using Job's method. Optionally, to make the red-wine complex, the ferric component would be calculated as shown above. If the 5-sulfosalicylate derivative is used instead of sodium salicylate, the amount for the reagent would be calculated as following:

$$218.185 \frac{g}{mol} \times 0.005 \frac{mol}{L} = 1.091 \frac{g}{L}$$

that is $$0.109 \frac{g}{100 \text{ mL}}$$

that is about 0.11%. Similarly, these amounts would result in about 1:1 complex. A 1:1 ratio allows for a direct back calculation of the acid and chelating agent components of the rust removers.

The concentrated solution of each of the transition metal salt and the salicylate salt or acid, or derivative thereof may be diluted with water about 4 to about 10 times, about 5 to about 8 times, or about 5 times to obtain a working solution of the transition metal salt and a working solution of the salicylate salt or acid, or derivative thereof. In an embodiment, the colored reagent complex may be made by combining the transition metal salt, e.g., about 0.10 g to about 0.20 g, about 0.10 g to about 0.15 g, or about 0.135 g of ferric chloride hexahydrate, and the salicylate salt or acid, e.g., about 0.05 g to about 0.15 g, about 0.05 g to about 0.10 g, or about 0.08 g of sodium salicylate or about 0.05 g to about 0.20 g, about 0.10 g to about 0.15 g, or about 0.109 g 5-sulfo salicylate, in deionized water (e.g., about 80 mL to about 120 mL, or about 100 mL) to achieve about 0.005 mol/L concentration, then this may be diluted with water about 3 to about 10 times, or about 5 times to obtain a working solution of the transition metal salt and a working solution of the salicylate salt or acid, or derivative thereof. For example, about 2 mL of concentrated reagent may be added to about 10 mL of total solution to achieve a 5 fold dilution:

$$\frac{10 \text{ mL total}}{2 \text{ mL concentrate}} = 5 - \text{fold dilution.}$$

Preparing the colored reagent complex may include combining the transition metal salt and the salicylate salt or acid, or derivative thereof in deionized water to obtain a working solution of the transition metal salt and a working solution of the salicylate salt or acid, or derivative thereof, followed by mixing the working solution of the transition metal salt and the working solution of the salicylate salt or acid, or derivative thereof, and optionally mixing or agitation, to form the colored reagent complex.

The concentration of the colored reagent complex in the first reagent solution, and, if applicable, the second reagent solution, depends on the type of the rust removing agent used. A rust removing agent containing an organic acid, also referred to as an "organic acid rust remover," may require a less concentrated reagent solution than a rust removing agent containing an inorganic acid. For a rust remover that contains an inorganic acid, the starting concentration of the colored reagent complex in the reagent solution is higher. The range of reagent and acid must be determined. One means to address this is to maintain a consistent concentration of the reagent solution and dilute the rust removing agents as necessary to a desired concentration. As such the method disclosed herein may include diluting the sample with water by at least about 200 times. For organic acid rust removers, the sample may be diluted to about 200× to about 500×, or about 200× to about 400×. For rust removing agent containing an inorganic acid, the sample may be diluted to about 1000× to about 4000×, or about 2000× dilution. Test samples may be diluted significantly to avoid oversaturation of the detector. While titration methods need at least 1 to 10 mLs of sample, without dilution, the method of the disclosure is sensitive and may work best at very low concentrations. Working at low concentrations results in clear color disappearance. These dilution values may be determined, for example, per Tables 3, 4, 5, and 6.

TABLE 3

Ferric salicylate reagent concentration ranges and dilution

| mol/L | g/L | g/100 ml (%) | ppm | dilution of reagent |
|---|---|---|---|---|
| 0.02 | 9.344 | 0.9344 | 9344 | 1x |
| Reagent stock concentration: | | | 4672 | 2x |
| | | | 2336 | 4x |
| | | | 1868.8 | 5x |
| | | | 934.4 | 10x |
| Upper working regent concentration: | | | 467.2 | 20x |
| | | | 233.6 | 40x |

TABLE 4

Ferric salicylate absorption values by concentration range and dilution

| dilution of reagent | Absorbance FeSal. | FeSal. (mol/) | FeSal. (g/100 ml) | Experimental FeSal. (ppm) | Theoretical FeSal. (ppm) |
|---|---|---|---|---|---|
| | 2 | 0.00126 | 0.05869 | 586.9 | |
| | 1.9 | 0.00119 | 0.05576 | 557.6 | |
| | 1.8 | 0.00113 | 0.05282 | 528.2 | |
| | 1.7 | 0.00107 | 0.04989 | 498.9 | |
| | 1.6 | 0.00101 | 0.04695 | 469.5 | |

TABLE 4-continued

Ferric salicylate absorption values by concentration range and dilution

| dilution of reagent | Absorbance FeSal. | FeSal. (mol/) | FeSal. (g/100 ml) | Experimental FeSal. (ppm) | Theoretical FeSal. (ppm) |
|---|---|---|---|---|---|
|  | 1.59 | 0.00100 | 0.04666 | 466.6 |  |
|  | 1.58 | 0.00099 | 0.04637 | 463.7 |  |
|  | 1.57 | 0.00099 | 0.04607 | 460.7 |  |
|  | 1.56 | 0.00098 | 0.04578 | 457.8 |  |
| 20x | 1.55 | 0.00097 | 0.04549 | 454.9 | 467.2 |
|  | 1.54 | 0.00097 | 0.04519 | 451.9 |  |
|  | 1.53 | 0.00096 | 0.04490 | 449.0 |  |
|  | 1.52 | 0.00095 | 0.04461 | 446.1 |  |
|  | 1.51 | 0.00095 | 0.04431 | 443.1 |  |
|  | 1.5 | 0.00094 | 0.04402 | 440.2 |  |
|  | 1.4 | 0.00088 | 0.04109 | 410.9 |  |
|  | 1.3 | 0.00082 | 0.03815 | 381.5 |  |
|  | 1.2 | 0.00075 | 0.03522 | 352.2 |  |
|  | 1.1 | 0.00069 | 0.03228 | 322.8 |  |
|  | 1 | 0.00063 | 0.02935 | 293.5 |  |
|  | 0.9 | 0.00057 | 0.02641 | 264.1 |  |
| 40x | 0.8 | 0.00050 | 0.02348 | 234.8 | 233.6 |
|  | 0.7 | 0.00044 | 0.02054 | 205.4 |  |
|  | 0.6 | 0.00038 | 0.01761 | 176.1 |  |
|  | 0.5 | 0.00031 | 0.01467 | 146.7 |  |
|  | 0.4 | 0.00025 | 0.01174 | 117.4 |  |
| 100x | 0.3 | 0.00019 | 0.00880 | 88.0 | 93.44 |
|  | 0.2 | 0.00013 | 0.00587 | 58.7 |  |
|  | 0.1 | 0.00006 | 0.00293 | 29.3 |  |

The concentrated colored reagent complex solution (or "concentrated stock reagent solution") may be too strong and have absorption values above 2 that results in saturation of the detector and therefore it is not possible to perform measurements to determine the concentrations of the rust removing agents. In which case, dilution of the concentrated colored reagent complex solution must be done prior to measurements. The upper value of the concentration is at 20× dilution, that is equivalent to 454.9 ppm colored reagent complex. In the case of ferric salicylate, a 4× diluted, equivalent to 2336 ppm of colored reagent complex is recommended due to health and safety concerns.

Concentrated solution of ferric salicylate is not stable over a long period of times at higher concentrations. At 4× dilution, the shelf life can be extended from one month to six months.

Before adding the sample, the method herein may include a step of determining an absorbance value of the first reagent solution, wherein the desired absorbance value is about 1.4 to about 1.9, or about 1.50 to about 1.8. If the absorbance value of the first reagent solution falls outside the desired range, a new first reagent solution should be prepared before proceeding to add the sample.

When the absorption value is at 0.1, the colored reagent complex is considered depleted. For measurements, the absorption value of the reagent solution is recommended not to be lower than 1.3, equivalent to 381.5 ppm. When performing a measurement, a check of the absorption value of the reagent solution must be performed first. If it is below 1.3, a fresh reagent solution should be used that has an absorption value of 1.50 to 1.55 corresponding to 454.9 ppm colored reagent complex.

TABLE 5

Ferric 5-sulfosalicylate reagent concentration ranges and dilution

| mol/L | g/L | g/100 ml (%) | ppm reagent | dilution of reagent |
|---|---|---|---|---|
| 0.02 | 9.844 | 0.9844 | 9844 | 1x |
| Reagent stock concentrations |  |  | 4922 | 2x |
|  |  |  | 2461 | 4x |
|  |  |  | 1968.8 | 5x |
|  |  |  | 984.4 | 10x |
| Upper working reagent concentration: |  |  | 492.2 | 20x |
|  |  |  | 246.1 | 40x |
|  |  |  | 98.44 | 100x |

TABLE 6

Ferric salic5-sulfosalicylate reagent absorption values by concentration range and dilution

| dilution of reagent | Absorbance FeSal. | FeSal. (mol/) | FeSal. (g/100 ml) | Experimental FeSal. (ppm) | Theoretical FeSal. (ppm) |
|---|---|---|---|---|---|
|  | 2 | 0.00111 | 0.05469 | 546.9 |  |
|  | 1.9 | 0.00106 | 0.05195 | 519.5 |  |
|  | 1.8 | 0.00100 | 0.04922 | 492.2 |  |
|  | 1.77 | 0.00098 | 0.04840 | 484.0 | 492.2 |
| 20x | 1.7 | 0.00094 | 0.04649 | 464.9 |  |
|  | 1.6 | 0.00089 | 0.04375 | 437.5 |  |
|  | 1.5 | 0.00083 | 0.04102 | 410.2 |  |
|  | 1.4 | 0.00078 | 0.03828 | 382.8 |  |
|  | 1.3 | 0.00072 | 0.03555 | 355.5 |  |
|  | 1.2 | 0.00067 | 0.00061 | 328.1 |  |
|  | 1.1 | 0.00061 | 0.00056 | 300.8 |  |
|  | 1 | 0.00056 | 0.00050 | 273.4 |  |
|  | 0.9 | 0.00050 | 0.02461 | 246.1 |  |
| 40x | 0.88 | 0.00049 | 0.02406 | 240.6 | 241.2 |
|  | 0.8 | 0.00044 | 0.02188 | 218.8 |  |
|  | 0.7 | 0.00039 | 0.01914 | 191.4 |  |
|  | 0.6 | 0.00033 | 0.01641 | 164.1 |  |
|  | 0.5 | 0.00028 | 0.01367 | 136.7 |  |
|  | 0.4 | 0.00022 | 0.01094 | 109.4 |  |
| 100x | 0.35 | 0.00019 | 0.00957 | 95.7 | 96.5 |
|  | 0.3 | 0.00017 | 0.00820 | 82.0 |  |
|  | 0.2 | 0.00011 | 0.00547 | 54.7 |  |
|  | 0.1 | 0.00006 | 0.00273 | 27.3 |  |

Ferric 5-sulfosalicylate is not a hazard concern. Therefore the concentrated reagent complex solution does not have to be diluted to any lower concentration values for health and safety purposes. It is also more stable than the purple ferric salicylate reagent complex and has a longer shelf life, at least six months. However, the concentrated colored reagent complex solution, similarly to the purple ferric salicylate reagent, is too strong and has an absorption value above 2 that results in saturation of the detector. Dilution of the concentrated colored reagent complex solution must be done prior to measurements. The upper value of the concentration in the reagent solution may be at 20× dilution, that is equivalent to 484.0 ppm colored reagent complex.

When the absorption value of the reagent solution is at 0.1, the colored reagent complex may be considered depleted. For measurements, the absorption value is recommended not to be lower than 1.3, equivalent to 355.5 ppm colored reagent complex. When performing a measurement, the absorption value of the reagent solution should be performed first. If it is below 1.3, a fresh reagent solution should be prepared that has an absorption value of 1.77 to 1.70 corresponding to 484.0 ppm colored reagent complex.

In calculating dilution of the sample and a concentrated colored reagent complex solution, a target value of the final concentration of the acid, in ppm, in the rust remover is lower than the ppm value of the colored reagent complex in the reagent solution, e.g. first or second reagent solution. If the amount of the acid or chelating agent in the rust remover is known, the dilution can be estimated by using the Tables 1 or 2 above. Take the concentration of the acid or chelating agent in the rust remover and convert it into ppm units, which may be a value that is lower than the rust remover concentration. For example, if the total acid or chelating agent content of the rust remover is 6%, this converts to 60,000 ppm acid or chelating agent (i.e., rust removing agent). Then measure the absorption value of the purple reagent solution, e.g., 1.55 when using purple ferric salicylate as the colored reagent complex. From Table 3, this corresponds to 454.9 ppm purple colored reagent complex. Then the 60,000 ppm rust removing agent may be diluted to under 454.9 ppm. Then according to Table 1, a 200× dilution and 60,000 ppm would end up being at 300 ppm level.

If the amount of acid or chelating agent in the rust remover is unknown, there may be an additional step. For examples, first, obtain a sample of the rust remover from the tank; make a dilution of 100× first (e.g., add 0.25 ml of the rust remover to a test tube and add deionized water up to 25 mL), then follow a method of the disclosure: e.g., prepare a first reagent solution comprising a colored reagent complex; determine an absorption value of the first reagent solution to determine the ppm concentration of the colored reagent complex; prepare a second reagent solution comprising the colored reagent complex and an equal amount of 100× diluted sample; and determine an absorption value of the second reagent solution. If the absorption value is 0, then the concentration of rust removing agent in the sample is too high and it should be diluted further. The next attempt may be using a 200× diluted sample. This may be repeated until the absorption value is 0.2 or 0.3 for a fresh, unused rust remover sample. This dilution value may be recorded for your reference.

The method of detecting the amount of rust removing agent may include preparing one or more, or two, reagent solutions containing a colored reagent complex in a known concentration (the desired concentration of the colored reagent complex depends on the strength of the acid in the rust removing agent). Preparing a first reagent solution comprising the colored reagent complex may include adding a sample of the colored reagent complex made according to any of the means discussed above and diluting the colored reagent complex to a desired concentration. The first reagent solution may be substantially the same visible color as the colored reagent complex, and the absorbance value may be recorded to obtain an initial value, which is the upper absorbance value. In one embodiment, about 4 mL of water may be added to about 1 mL of the colored reagent complex to make 5 mL of a first reagent solution.

While the colored reagent complex may theoretically react to all acids and chelating agents, because this mechanism is concentration dependent, at very low concentrations, some acids would have very low to almost no effect on the colored reagent complex. This is important to note when the rust remover contains more than one acid or complexing agents in the same formulation. Accordingly, when a rust remover contains two organic acids at low concentrations, one of the acids would almost have zero effect on the colored reagent complex while the other acid may break up the colored reagent complex entirely. Consequently, the method disclosed herein using spectrometry is more selective than a titration method, which would measure the total acid content.

The next step may include adding the sample, which may optionally be diluted, to at least a portion of the first reagent solution to make a test sample solution. This may include adding the sample to the first reagent solution in about equal parts, that may result in further 2× dilution of the sample of rust remover, resulting in, for example, an about 400× fold dilution of organic acids, or about 8000× dilution in the case of inorganic acids. The diluted sample may be added to the first reagent solution in a ratio of about 1:2 to about 2:1 or about 1:1. In an embodiment, about 2 mL to about 10 mL of the sample may be added to about 2 mL to about 10 mL of the first reagent solution, or about 5 mL of the sample may be added to about 5 mL of the first reagent solution. After adding, the test sample solution may be mixed or agitated. Color reduction or disappearance may follow within about 30 seconds, about 20 second or about 10 seconds of mixing/agitating.

In an embodiment, an equal part of 5 mL of the diluted sample may be added to the 5 mL of first reagent solution and the final concentration of the colored reagent complex in the test sample solution may be about 0.01 mol/L. The term water as used herein refers to deionized water. The test sample solution may contain the colored reagent complex in a concentration of about 0.005 mol/L to about 0.03 mol/L, about 0.008 mol/L to about 0.015 mol/L, or about 0.01 mol/L. The diluted sample may be a portion of the sample working fluid that has been diluted with water by about 200 times to about 400 times in case of an organic acid, or about 1000 to about 4000 times in the case of an inorganic acid. The test sample solution may be substantially the same visible color as the first reagent solution, or it may be lighter in color, and the absorbance value may be recorded to obtain an absorbance value which may be compared to the upper absorbance value. This comparison may be used as a qualitative analysis to determine whether the sample has been depleted of the rust removing agent. To complete the comparison, a reference solution may be prepared that contains the colored reagent complex, water, and a standard solution that contains a known amount of rust removing agent.

Evaluating the color or absorbance of the test sample solution may include measuring the absorbance value of the test sample solution at an optimal wavelength. The absorbance value of the test sample solution may be compared to known absorbance value(s) of a reference solution or other tested sample(s) that contain known amounts of the rust removing agent, in order to estimate the amount of rust removing agent in the sample and/or whether it must be replenished. For more accurate determination of concentration, the absorbance value of the test sample solution may be compared to values on a reference table or graph to calculate the exact concentration of the rust removing agent. A reference table or graph may be provided to the user, optionally within a kit. The absorbance values are concentration dependent and may be calculated and inserted into a reference table or graph. The user may be able to utilize the calculated absorbance values to insert into a formula for calculating concentration of rust removing agent in the sample. In order to effectively create a reference table and calculate the exact concentration of the rust removing agent in the sample, the molecular weight of the acid or chelating agent should be known. If not, the exact ppm values are not able to be determined. However, the percent depletion of the rust removing agent can be determined by measuring and comparing the absorbance value of a reference solution incorporating new and unused working fluid as the standard vs. the absorbance value of a test solution containing a sample of the used working fluid.

Evaluating the color may include visible inspection of the test sample solution. If the color of the test sample solution has been eliminated, a suitable amount of rust removing agent may still be present in the working fluid from which the sample was obtained and the rust removing agent may not need to be replenished.

In these methods, the concentration of the remaining colored reagent complex after exposure to the rust removing agent in the working fluid or rust remover is determined. From the measured absorbance value of the remaining colored reagent complex, the amount of rust removing agent (e.g., acid) that was in the sample and that reacted with (and broke down) the colored reagent complex may be calculated.

The method disclosed herein may utilize a set of short calculations to determine the concentration of the rust removing agent from the absorption values from the UV-VIS measurements. The method uses Lambert-Beer's Law to calculate the concentration of the colored reagent complex in the first reagent solution, reference solution, and/or test sample solution from the absorbance values. The absorbance values relate to the amount of colored reagent complex present or still present, at the determined optimal wavelength of the colored reagent complex. The absorbance value does not directly relate to the acid or chelating agent in the rust remover, but the concentration of the rust remover agent may be calculated after determining the amount of colored reagent complex present in the test sample solution.

If the rust remover only contains one rust removing agent, the method is straightforward, and the colored reagent complex will respond to that one rust removing agent. The rust removers may contain two or more acids or chelating agents. For example, in an inorganic acid-based rust remover, there may be two inorganic acids, e.g., sulfuric acid, $H_2SO_4$, and phosphoric acid, $H_3PO_4$. Both acids are very strong, and the phosphoric acid creates a very stable, colorless complex. Once the phosphate attaches to the ferric ion component from the colored reagent complex, the reaction will be irreversible. However, the sulfuric acid component will also contribute to the color reduction of the colored reagent complex, therefore both acids will contribute to the loss of color of the test sample solution. In which case, the combined acid strength/concentration will be detected and calculated. In an acid-based rust remover containing two organic acids, e.g., lactic acid and citric acid, both alpha hydroxy carboxylic acids, citric acid is a larger molecule with three carboxylic acid groups and one hydroxyl group, while lactic acid is a smaller molecule with one carboxylic acid group and one hydroxyl group. Because citric acid contains more carboxylic acid groups than lactic acid, the citric acid component will be more dominant, while the lactic acid component may have some contribution to the color disappearance as well. The concentration of the diluted rust removers may render the less dominant acid component contribution insignificant. In that case only the citric acid may be detectable and contribute to the color change of the test sample solution.

The amount of rust removing agent in a sample of working fluid may be detected by utilizing one or more different types of UV-VIS wavelength analyzers. Such analyzers are known to the literature and to the art and detect the amount of absorbed light at a specific wavelength (monochomator), or over a range of wavelengths (polychromator or scanning detector). Notable examples include spectrophotometers that measure either visible light alone, or a combination of UV and visible light (UV-VIS). Manufacturers of such instruments, including Agilent, ThermoFisher, Shimadzu, Perkin Elmer, Jasco, Hach, and Mettler Toledo among others, produce various single-beam as well as multiple-beam models, all of which are suitable for measuring corrosion inhibitor induced color changes to the analytical reagent in the liquid phase. Such analyzers generally can detect wavelengths from about 200 to about 1100 nm, which extends slightly beyond the nanowavelength of visible light into the ultraviolet (UV) and infrared regions of the electromagnetic spectrum. Select examples of current model instruments include the Cary series from Agilent (Cary 60, Cary 3500, Cary 4000, Cary 5000, Cary 6000, Cary 7000), the Spectronic 200, Genesys 30, Genesys 40/50, Genesys 140/150, Genesys 180, Evolution 201/220, Evolution 260, Evolution 350, NanoDrop one/one, NanoDrop 8000, and the NanoDrop Lite from ThermoFisher, the UV-1280, BioSpec-Nano, UV-1900i, UV-2600i, UV-2700i, and the UV-3600i from Shimadzu, the Lambda series from Perkin Elmer (Bio, Bio+, XLS, XLS+, 850+, 1050+), the V series from Jasco (V-730, V-750, V-760, V-770, V-780, MV-3000), the DR series from Hach (DR1900, DR3900, DR6000), and the UV5, UV7, UV5BIO, and UV5NANO from Mettler-Toledo. Additional instruments widely used include the Agilent-HP 8453, the 721 and 752 (multiple manufacturers), the Varian Cary 50 and Cary 50B10, and the Lamda series of instruments from Perkin Elmer (Lamba 20, 25, 30, 35, and 40).

A general workflow for combining the colored reagent complex with spectrophotometric analysis to measure rust removing agent concentration in solutions is provided herein. Initially, the optimal absorbance wavelength for measuring rust removing agent concentration in the fluid of interest must be determined if not already known. This is most readily done using a polychromatic or scanning sprectrophotometer to measure absorbance changes across a broad range of wavelengths (ex. 200-900 nm) in response to increasing rust removing agent concentration. Specifically, the absorbance spectrum for the colored reagent complex mixed with fluids containing increasing concentrations of the rust removing agent are measured and compared, typically by plotting the resulting spectra together on the same graph. The optimal wavelength is then determined by identifying on the graph where the greatest change in absorbance occurs in response to increasing rust removing agent concentration. With the optimal absorbance wavelength defined, all future concentration measurements for this rust removing agent can be made using absorbance at this single wavelength.

When the optimal wavelength for the colored reagent complex is known, the method of measuring the concentration of the rust removing agent in a sample may comprise the following steps: 1) Setting a spectrophotometer to the optimal wavelength, e.g., 530 nm; 2) Measuring an absorbance value of a first reagent sample comprising the colored reagent complex, optionally in combination with a solution containing 0% of the rust removing agent; 3) Defining and recording this absorbance value as the reference value for future measurements; 4) Measuring and recording the absorbance value of a reference solution comprising the complex colored reagent and a standard solution containing a known amount of rust removing agent; 5) Preparing a test same solution comprising a portion of the first reagent solution and a sample containing the same rust removing agent as in the standard solution but at an unknown concentration, and recording the final dilution factors; 6) Measuring and recording the absorbance value of the test sample solution; 6) Calculating the rust removing agent concentration in the test sample solution using a method described herein; e.g., via comparative method or calculation method. In this example, a conventional linear regression method would not work because the absorption values would be in the negative domain due to color disappearance, which would be reflected in a decreasing slope. When the exact molecule of the rust removing agent is not known, the comparative method may preferably be used instead of the calculation method, which requires that the rust removing agent be known.

For example, if a rust remover contains 3% known acid (e.g., phosphoric acid), that equates to 30,000 ppm acid. After performing a ten-fold dilution, the concentration would be 3,000 ppm. As a next step, the diluted sample may be mixed with the colored reagent complex, at an amount based on the above method: e.g., add 0.5 mL of the diluted sample and fill to 10 mL with the first reagent solution containing the colored reagent complex, the final dilution will be 20×10=200-fold.

If using the calculation method to determine the amount of rust removing agent in the sample, two measurements are needed. One is to determine the absorption value of the colored reagent complex alone, and the second is to determine the absorption value of the mixture of the colored reagent complex and the diluted sample. To perform the calculations, the process may include the following steps: 1) measuring and recording the absorption value of the first reagent solution comprising the colored reagent complex, e.g., in this example, ferric salicylate; 2) measuring and recording the absorption value of the test sample solution comprising the first reagent solution and the diluted sample (the absorption value of the test sample solution represents the amount of colored reagent complex that was not broken up by the acid); 3) determine the ferric salicylate concentration in ppm, e.g., from Table 3 and 4, for both measured absorption values. By subtracting these numbers, the resulting ppm value represents the amount of colored reagent complex that was broken up by the acid; 4) Converting the ppm value (of ferric salicylate conc.) to g/L, and convert g/L to mol/L. 5) Multiplying this value with ⅔ factor to determine the phosphate ion concentration that reacted with the colored reagent complex; and 6) Converting this value of phosphate ion concentration back to g/L phosphoric acid and then convert g/L to ppm phosphoric acid.

Comparative method of determining the amount of rust removing agent in the sample may also be used. If a fresh/new rust remover contains 3% phosphoric acid, then a used sample would contain less than 3%. The closer this value is to 0 the more depleted the rust remover is of phosphoric acid. A calibration curve similar to linear regression may be used to compute the amount depleted by comparative method. A first step may include constructing a standard curve by: 1) preparing a plurality of standard solutions with varying dilution amounts, such as 0%, 5%, 10%, 25%, 50%, 75% dilution of sample; 2) preparing a mixture of i) further diluted sample in the manner described whereby a final dilution will be 20×10=200-fold, and ii) colored reagent complex for absorption measurements and added to the colored reagent in the manner described above to create a final dilution will be 20×10=200-fold; 3) determining the absorption values and plotting the values to create a standard curve with a decreasing slope; 4) preparing a test sample solution in the same manner as it was done for the standard solutions and measuring the absorption value of the test sample solution; 5) plotting the absorption value of the test sample solution on the standard curve, and estimating the concentration of the rust removing agent in the sample based on the position of the absorption value of the test sample solution on the standard curve.

Another comparative method of detecting an amount of a rust removing agent in a sample, and using only two reagents, is disclosed, including: forming a colored reagent complex from a reaction of a transition metal salt and a salicylate salt or acid, or a derivative thereof; preparing a first reagent solution containing the colored reagent complex and a second reagent solution containing the colored reagent complex, wherein the first reagent solution and the second reagent solution are substantially equivalent; adding a standard solution containing a known amount of the rust removing agent to the second reagent solution to make a reference solution and developing a color; adding the sample to the first reagent solution to make a test sample solution; determining an absorption value of the test sample solution at an optimal wavelength, and an absorption value of the reference solution at the optimal wavelength; comparing the absorption value of the reference solution and the absorption value of the test sample solution.

The terms in this embodiment have the same meaning as discussed above in relation to other embodiments. Preparing a second reagent solution is done in the same way as the first reagent solution, as detailed above. The first reagent solution and the second reagent solution are substantially equivalent which means that the solutions contain about the same concentration of the same colored reagent complex, to the same extent of dilution and in the same solvent.

Evaluation of the results may include the steps of comparing the absorption value for the reference solution and the absorption value of the test sample solution. In comparing the absorption values, when the absorption value of the test sample solution is higher than the absorption value of the reference solution, then the amount of the rust removing agent in the sample is less than the known amount in the standard solution. In comparing the absorption values, when the absorption value of the test sample solution is less than the absorption value of the reference solution, then the amount of the rust removing agent in the sample is more than the known amount in the standard solution. when a visible color of the test sample solution becomes lighter than the color of the reference solution, then the amount of the rust removing agent in the sample is more than the known amount in the standard solution.

The standard solution may be provided in a kit or it may be prepared from new and unused rust remover that is the same brand and type as the (used) sample being tested.

Adding a standard solution containing a known amount of the rust removing agent to the second reagent solution may include adding the standard solution to the second reagent solution in about equal parts, or adding the standard solution to the second reagent solution in a ratio of about 1:2 to about 2:1 or about 1:1. In an embodiment, about 2 mL to about 10 mL of the standard solution may be added to about 2 mL to about 10 mL of the second reagent solution, or about 5 mL of the standard solution may be added to about 5 mL of the second reagent solution. Color reduction or disappearance may follow within a period of time, such as within about 30 seconds, or within about 10 seconds.

A method for monitoring when a working fluid containing a rust removing agent needs to be replenished is disclosed. The method may include the steps of: obtaining a sample of the working fluid; forming a colored reagent complex from a reaction of a transition metal salt and a salicylate salt or acid, or a derivative thereof; preparing a first reagent solution containing the colored reagent complex and a second reagent solution containing the colored reagent complex, wherein the first reagent solution and the second reagent solution are substantially equivalent; adding a standard solution containing a known amount of the rust removing agent to the second reagent solution to make a reference solution and developing a color; adding the sample to the first reagent solution to make a test sample solution; determining an absorption value of the test sample solution at an optimal wavelength and an absorption value of the reference solution at the optimal wavelength; comparing the absorption value of the reference solution and the absorption value of the test sample solution. In comparing the absorption values, if the absorption value of the test sample solution is higher than the absorption value of the reference solution, there is a lower concentration of rust removing agent in the sample than in the standard solution and the working fluid should be replenished. This also may be understood as a showing of depletion of the rust removing agent. In comparing the absorption values, when the absorption value of the test sample solution is less than the absorption value of the reference solution, there is a higher concentration of rust removing agent in the sample than in the standard solution and the working fluid does not need to be replenished.

A kit for determining when a sample is depleted of a rust removing agent is disclosed. The kit may include a concentrated colored reagent complex solution comprising a transition metal salt and a salicylate salt or acid, or a derivative thereof, optionally, in about a 1:1 ratio. The colored reagent complex may be ready to use in deionized water at about a 0.005 mol/L concentration. The kit may include a standard solution containing a known amount of the rust removing agent, for example, having an acid content of about 7 wt. % to about 10 wt. %, about 7.5 wt. %, or about 10 wt. %, or a series of standard solutions with known amounts of rust remover to facilitate the preference of the customer who chooses to either use the comparative method or to use the calculation method to monitor their rust remover. The kit may include a reference table or graph, and/or instructions for use. The kit may also include a plurality of test tubes of any size and a plurality of pipettes. The kit may be used to provide a customer with a tool to evaluate the health of a rust removing bath.

The features and advantages of the present disclosure are more fully shown by the following examples which are provided for purposes of illustration, and are not to be construed as limiting the invention in any way.

EXAMPLES

Example 1

Tests were conducted to determine which of the transition metals and salts thereof, and which of the salicylate derivatives may be used in forming the colored reagent complexes disclosed herein. The salicylate compound is the core material. If there are other substituents (groups) on the core compound, different derivates are obtained, that result in a different colored reagent complex when reacted with, e.g., the ferric cation. There are three sites on the base salicylate compound where other groups or substituents can attach: the carboxylic site, the hydroxyl site, and the benzene ring.

TABLE 7

| Derivatives of the salicylic component of the reagent: | Observations and notes: |
|---|---|
| <br>Salicylic Acid | In its salt form, salicylic acid is soluble in water but it has very low solubility in its acid form. It forms a very strong purple color with ferric chloride. Measurement is at 530 nm. The reagent is relatively stable for up to six months. It forms quite stable complex with ferric chloride but not with ferric nitrate. It forms complexes with $Fe^{2+}$, and $Cu^{2+}$, but they are not stable and not strong enough to perform measurements. Toxic component was above 0.1% but it was adjusted to be below this value. |
| <br>Sodium salicylate | |
| <br>Acetylsalicylic acid, Aspirin | Didn't work until the solution was heated. Because of steric hindrance, not all ferric ion was complexed by the acetyl salicylate ion. Here the hydrogen atom, from the hydroxyl group, is substituted for a bulkier group. It doesn't respond to the acids or chelating agents. |

TABLE 7-continued

| Derivatives of the salicylic component of the reagent: | Observations and notes: |
|---|---|
| <br>Methyl salicylic acid | Forms purple complex but it is not strong enough color. Dilution has a negative effect, meaning, the purple color disappears with dilution. It also forms an oily layer. |
| <br>Ethyl salicylic acid | Forms a purple complex but the purple complex has half the efficacy of the original salicylate complex. When mixed, it has to be shaken vigorously to form the purple complex. It forms an oily layer. |
| <br>Thio salicylic acid | Does not form colored complex. Both components stay separate in solution. Heat doesn't help to create the complex. |
| <br>5-sulfo-salicylic acid | Forms a strong and quite stable wine-red complex. Responds to acids and other chelating agents. Would have to be diluted similarly to the purple reagent. It shifts the wavelength to 505 nm. Broad peak. It can be a substitute for the purple complex. Molar absorptivity changes therefore the reference table for calculations, has to be determined. |

Some important conclusions can be drawn from the study of the different derivatives is that the hydroxyl group is best present and free, meaning the hydrogen of the hydroxyl group should not be substituted with other groups, like in the case of Aspirin. A thiol group will not help to form any complexes. The hydrogen from the carboxylic group can be substituted with other organic groups, and it may form a purple complex, but the steric hindrance would create a weaker and less responsive reagent.

Substituents on the benzene ring, of the salicylate component, can have a positive or negative effect depending on electron donating or electron withdrawing nature of the group. It was found that a sulfo-group on the benzene ring, that is electron withdrawing, has a stabilizing effect on the reagent. However, the color of the reagent will be different. Another contraindication is that some groups make the salicylate compound very unstable. For example, a nitro group may allow the salicylic compound to chelate the ferric ion to form a colored complex but before that could happen, the compound would decompose due to its own instability.

Example 2

Different transition metals and salts thereof were tested. The results are shown in Table 8.

TABLE 8

| Metal component of the reagent: | |
|---|---|
| Ferric chloride, $FeCl_3$<br>Results in a $Fe^{3+}$ ion | Forms purple complex with sodium salicylate and wine-red complex with 5-sulfosalicylic acid. |

TABLE 8-continued

Metal component of the reagent:

| | |
|---|---|
| Ferrous chloride, FeCl$_2$ Results in Fe$^{2+}$ ion | Wine red but not very strong complex with both salicylate and 5-sulfosalicylic acid. These complexes precipitate out within a week. |
| Ferric nitrate, Fe(NO$_3$)$_3$ Results in Fe$^{3+}$ ion | Forms purple complex with sodium salicylate that is not stable and precipitates out within a few days but forms a rather stable complex with 5-sulfosalicylic acid. |
| Copper Sulfate, CuSO$_4$ Results in Cu$^{2+}$ ion | Results in a transparent green solution. When reacted with the acids, the solution turns murky and the UV-VIS method can't be used. |
| Other trivalent or bivalent cations of the transition metals could be tested but not all may give a colored complex. Likewise, other metal ions may or may not result in a colored complex or may or may not even form a complex. | For example, salicylate with Mn$^{2+}$ ion is a clear solution. |

Salicylate derivatives that didn't work well with the ferric ion, Fe$^{3+}$, were not combined with the ferrous, Fe$^{2+}$, or cupric ion, Cu$^{2+}$.

Example 3

Figure 4:
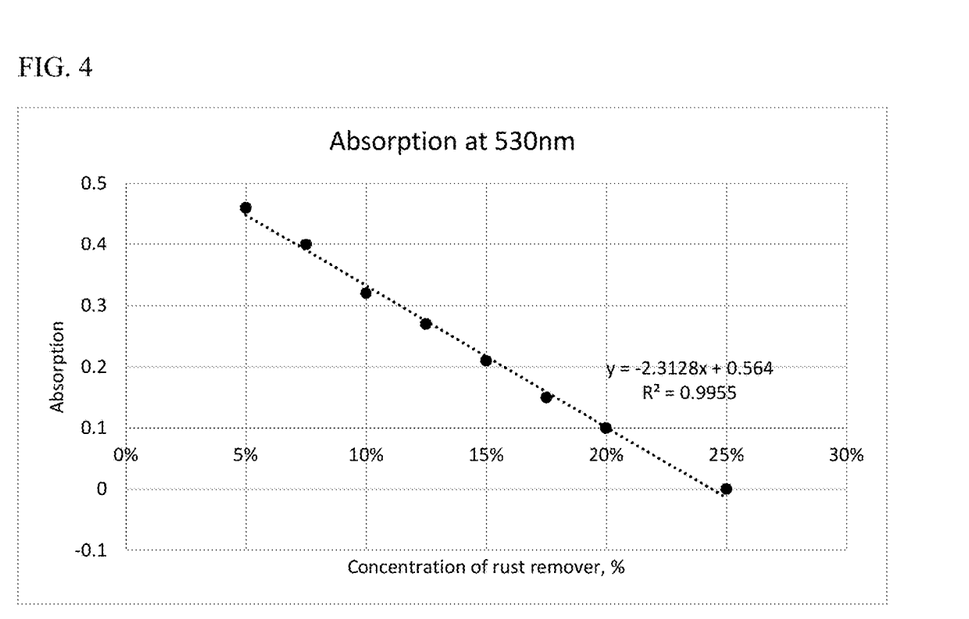
FIG. 4 is a graphical representation of the absorbance value versus rust removal concentration showing an organic acid response to ferric salicylate.

Ferric salicylate was prepared for use as the colored reagent complex. Four standard solutions were prepared at 20 wt. %, 15 wt. %, 10 wt. % and 5 wt. % of the rust removing agent. In other tests, one standard solution may be prepared at the predetermined cut-off value, which may be 10% or 7.5% etc. The standard solutions were then mixed with the colored reagent complex and the absorption values determined at a wavelength of 530 nm, as shown in Table 9. The absorbance values for the standard solution were also referred to as reference absorbance values. The absorbance value versus rust removal concentration was plotted on a graph as shown in FIG. 4.

TABLE 9

| Standard Sample | Reference absorbance value |
|---|---|
| 20% | 0.37 |
| 15% | 0.62 |
| 10% | 0.80 |
| 5% | 1.16 |

Figure 5:
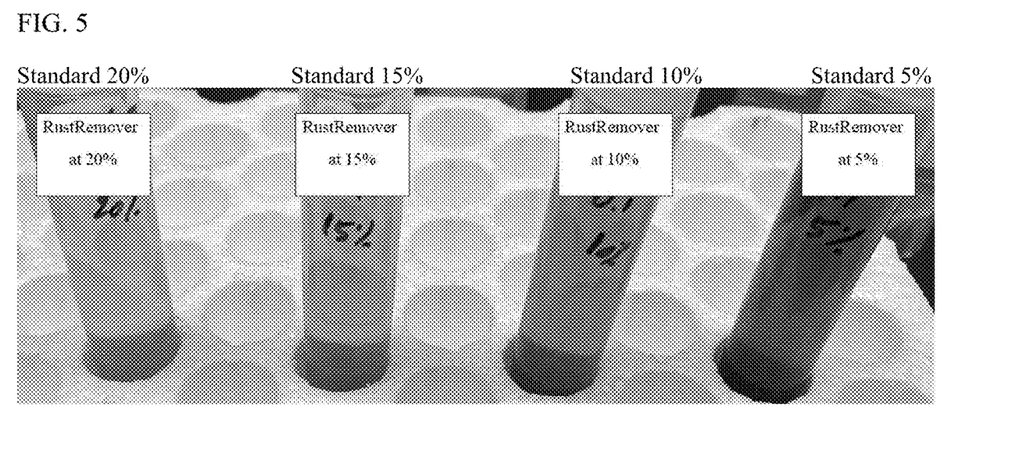
FIG. 5 includes photographs of test tubes containing test solutions at different stages of use.
Figure 6:
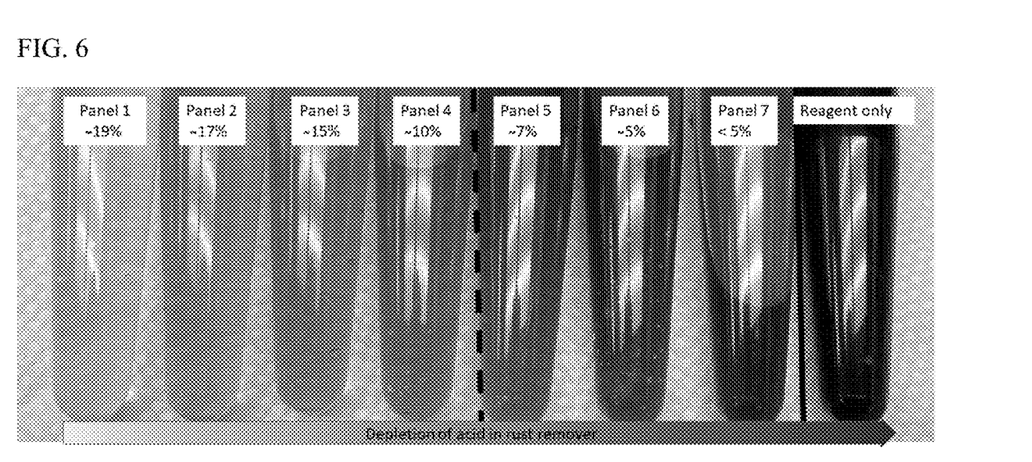
FIG. 6 includes photographs of test tubes containing test solutions and showing the change in color based on reaction with the colored reagent complex.

Each test sample solution was then prepared by adding 0.25 mL of the sample to a 50 mL tube and diluting with deionized water to make a 200× diluted test sample solution. To 15 mL of the test sample solution, add 1 mL the colored reagent complex (in a concentration of 0.02 mol/L stock solution). The tube was inverted and mixed, then measured for the absorbance value. The absorbance value of the test sample was plotted on the graph, or otherwise compared to the absorbance values determined for the standard solution (s). Table 10 shows samples collected, the absorbance values and the calculated amount of rust removing agent present in the sample. FIGS. 5 and 6 show the colors of the sample solutions. If the absorbance value of the test sample solution is higher than the standard solution, cut-off value, then the working fluid is depleted and needs to be replenished. More specifically, FIG. 5 shows test solutions at different stages of use. For example, when a fresh, unused sample, is at 20% dilution, the color due the presence of the colored reagent complex would be reduced more than would a 5% diluted rust remover that has a very low amount of rust removing agent present (i.e., is very near depletion). FIG. 6 shows a more detailed scenario of rust remover depletion in progress and the change in color of the colored reagent complex when reacted with a rust removing agent. It serves as a visual aid to the customer to better evaluate how extensive the depletion of the rust remover is. These samples were diluted by 200-fold or 1000-fold before reacting with the colored reagent complex.

TABLE 10

| Test Sample | Absorbance value | % left in the rust remover |
|---|---|---|
| P1 | 0.38 | 19.5 |
| P2 | 0.41 | 17.5 |
| P3 | 0.46 | 17.5 |
| P4 | 0.63 | 15 |
| P5 | 1.01 | 7.5 |
| P6 | 1.16 | <7.5 |
| P7 | 1.23 | <7.5 |

While there have been described what are presently believed to be various aspects and certain desirable embodiments of the disclosure, those skilled in the art will recognize that changes and modifications may be made thereto without departing from the spirit of the disclosure, and it is intended to include all such changes and modifications as fall within the true scope of the disclosure.

Although the invention has been described in detail with reference to certain preferred embodiments, variations and modifications exist within the scope and spirit of the invention as described and defined in the following claims.

What is claimed:

1. A method of detecting an amount of a rust removing agent in a sample, the method comprising the steps of:
    forming a colored reagent complex from a reaction of a transition metal salt and a salicylate salt or acid, or a derivative thereof;
    preparing a first reagent solution comprising the colored reagent complex, wherein the first reagent solution is substantially the same visible color as the colored reagent complex;
    adding the sample to the first reagent solution to make a test sample solution; and
    evaluating the color or absorbance of the test sample solution to detect the amount of rust removing agent in the sample.

2. The method of claim 1, wherein the transition metal salt comprises a ferric ion (Fe$^{3+}$), a ferrous ion (Fe$^{2+}$), or a cupric ion (Cu$^{2+}$).

3. The method of claim 1, wherein the salicylate salt or acid is a salicylate salt.

4. The method of claim 1, wherein the derivative salicylate salt or acid is substituted salicylic acid.

5. The method of claim 4, wherein the substituent is an electron withdrawing group selected from the group consisting of: a halide, an aldehyde, an ester, a sulfo-group, a carboxylic group, a nitrile-group, a tertiary amine, and a nitro group.

6. The method of claim 1, wherein the colored reagent complex is formed from a reaction of sodium salicylate and a ferric ion.

7. The method of claim 6, wherein the colored reagent complex comprises a ferric ion and a salicylate ion in about a 1:1 ratio.

8. The method of claim 1, wherein the colored reagent complex is a purple, or a red color.

9. The method of claim 1, wherein the colored reagent complex reacts with an acid to break up the colored reagent complex.

10. The method of claim 1, wherein the colored reagent complex has an optimal wavelength of about 500 nm to about 550 nm.

11. The method of claim 4, wherein the colored reagent complex is formed from a reaction of a salicylic acid derivative substituted at the 5 position on the benzene ring, and a ferric ion.

12. The method of claim 4, wherein the colored reagent complex is formed from a reaction of 5-cyanosalicylic acid, 5-halosalicylic acid, 5-formylsalicylic acid, 5-nitrosalicylic acid, 5-sulfosalicylic acid, 5-sulfosalicylic acid, 5-sulfosalicylic acid, or 5-sulfosalicylic acid, and a ferric ion.

13. The method of claim 1, wherein evaluating the color or absorbance of the test sample solution comprises:
determining an absorption value of the test sample solution at an optimal wavelength of the colored reagent complex; and
comparing the absorption value to: i) a reference table or reference graph, or ii) a second absorption value of a reference solution.

14. The method of claim 1, wherein evaluating the color or absorbance of the test sample solution comprises: comparing the visible color of the test sample solution to a visible color of a reference solution.

15. The method of claim 1, further comprising determining a second absorption value of a reference solution at an optimal wavelength of the colored reagent complex.

16. The method of claim 13, wherein the reference solution comprises a standard solution containing a known amount of the rust removing agent and the colored reagent complex.

17. The method of claim 1, further comprising diluting the sample with water by at least about 200 times before the step of adding the sample to the first reagent solution.

18. The method of claim 1, wherein forming the colored reagent complex comprises the steps of: combining about 0.10 g to about 0.20 g of the transition metal salt and about 0.05 g to about 0.15 g the salicylate salt or acid, in about 80 mL to about 120 mL water to obtain a concentrated colored reagent complex solution, and diluting the concentrated colored reagent complex solution with water about 3 to about 10 times to obtain the colored reagent complex.

19. The method of claim 18, wherein the concentrated colored reagent complex solution has a concentration of about 0.01 mol/L to about 0.03 mol/L.

20. The method of claim 18, wherein the colored reagent complex is made by combining about 0.10 g to about 0.15 g ferric chloride hexahydrate, and about 0.10 g to about 0.15 g 5-sulfo salicylate, in about 100 mL water to obtain the concentrated colored reagent complex solution, and diluting the concentrated colored reagent complex solution with water about 5 times to obtain the colored reagent complex in about 0.005 mol/L concentration.

* * * * *